(12) United States Patent
Berdeal

(10) Patent No.: US 10,431,977 B1
(45) Date of Patent: Oct. 1, 2019

(54) METHOD OF SUPPLYING POWER TO MULTIPLE ELECTRONIC DEVICES THAT ARE GROUPED WITHIN A SPECIFIC SPACE

(71) Applicant: Jeffrey A Berdeal, Pembroke Pines, FL (US)

(72) Inventor: Jeffrey A Berdeal, Pembroke Pines, FL (US)

( * ) Notice: Subject to any disclaimer, the term of this patent is extended or adjusted under 35 U.S.C. 154(b) by 0 days.

(21) Appl. No.: 16/232,926

(22) Filed: Dec. 26, 2018

(51) Int. Cl.
  *H02J 1/00* (2006.01)
  *H02H 9/04* (2006.01)
  *H02M 7/04* (2006.01)

(52) U.S. Cl.
  CPC .................. *H02J 1/00* (2013.01); *H02H 9/04* (2013.01); *H02M 7/04* (2013.01)

(58) Field of Classification Search
  CPC ............... H02J 1/00; H02H 9/04; H02M 7/04

USPC ........................................................... 307/31
See application file for complete search history.

(56) References Cited

U.S. PATENT DOCUMENTS

2003/0230934 A1* 12/2003 Cordelli .................... G06F 1/26
                                                                            307/43

\* cited by examiner

*Primary Examiner* — Carlos Amaya
(74) *Attorney, Agent, or Firm* — Ruben Alcoba, Esq.

(57) ABSTRACT

A method of supplying power to multiple electronic devices that are grouped within a specific space that uses a multiport power supply to manipulate the voltage and amperage that goes to each electronic device. The method will use a multiport power supply that comprises of and AC/DC power supply, a distribution board that attached to the AC/DC power supply, at least one power adjustment circuit and wherein the power adjustment circuit comprises a voltage regulator, a voltage selector, and at least on DC output port.

3 Claims, 2 Drawing Sheets

METHOD OF SUPPLYING POWER TO MULTIPLE ELECTRONIC DEVICES THAT ARE GROUPED WITHIN A SPECIFIC SPACE

BACKGROUND

The present invention is directed to a method of supplying power to multiple electronic devices that are grouped within a specific space and thereby removing the clutter of having external power supplies within a fixed space.

The inventor of the present invention is an automation engineer that is contracted to setup, design and implement home or commercial automation systems.

During the course of the implementation of the automation systems he encountered the problem of not having enough outlet space to attach external power supplies nor the space to accommodate the power supplies. In addition, power plug adapters of electronic devices are not standard in size and sometimes occupy multiple plug spaces of power strips or power outlets thereby minimizing the amount devices that can be connected within a specific space.

To solve the aforementioned problem, the inventor realized that he needed a universal power supply that could be manipulated to accept multiple DC electronic devices within a fixed space.

In his experience in the industry he realized that if he were to use block connectors to attach to a universal power supply, that he could maximize the amount of electronic devices that could be connected to a single universal power supply within a fixed space. Ideally, he realized that if he had a universal powers supply that had at least 20 power outlet, that could be manually adjusted, that he could eliminate the clutter of having multiple DC power supplies within a fixed space.

Since there is no set standard in the operating voltage or plug type of electronic devices, due to their design, the inventor realized that he could not plug in the electronic devices to a set power supply, so he had to create a manner or method of connecting the devices to a universal power supply. To do this he realized that he had to cut the power supply cords that are supplied with existing electronic devices and modify them so that they could attach to the universal power supply of the present invention.

For the foregoing reasons, there is a need of using a multiport power supply to supply power to multiple DC electronic devices that are grouped within a specific space and its method of use.

SUMMARY

The present invention is a method of supplying power to multiple electronic devices that are grouped within a specific space using a multiport power supply that allows the user to manipulate the voltage to DC electronic devices. The method comprising the steps of providing a multiport power supply, wherein the multiport power supply comprises of an AC/DC power supply, a distribution board that has an integral fuse that attaches to the AC/DC power supply, at least one power adjustment circuit and wherein the power adjustment circuit comprises a voltage regulator, a voltage selector, and at least one DC output port hereinafter referred as a multiport power supply block connector. Providing at least one electronic device that has a power supply and the power supply has a cord. Cutting the cord of the power supply of the electronic device. Attaching a block connector to the cord of the electronic device, hereinafter the block connector shall be referred as an electronic device block connector. Connecting at least one of the electronic device block connectors to one of the multi power supply block connectors of the multiport power supply. And, reading a specification of each electronic device and adjusting the voltage selector so that the amperage and the voltage going to each electronic device matches the specification of each electronic device.

An object of the present invention is to provide a method of installing multiple DC electronic devices within a set space to a multiport power supply.

Another object of the present invention is to eliminate the clutter that is created using power cords of multiple DC powered electronic devices.

A further object of the present invention is to reduce failure points of electronic devices that are normally caused by forcibly plugging different sized plugs or adapters within existing power strips.

Yet a further object of the present invention is to provide a manner of protecting DC powered equipment from surge or overpower via one multiport power supply.

DRAWINGS

These and other features, aspects, and advantages of the present invention will become better understood with regards to the following description, appended claims, and drawings where:

DESCRIPTION

Figure 1:
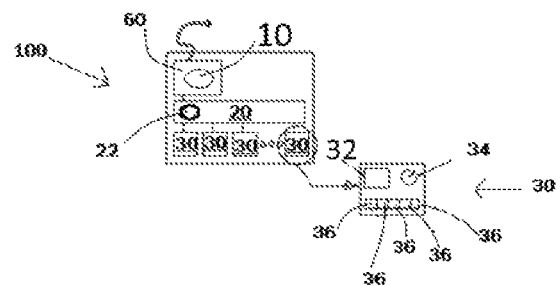
FIG. 1 shows a diagram of the multiport power supply of the present invention.
Figure 2:
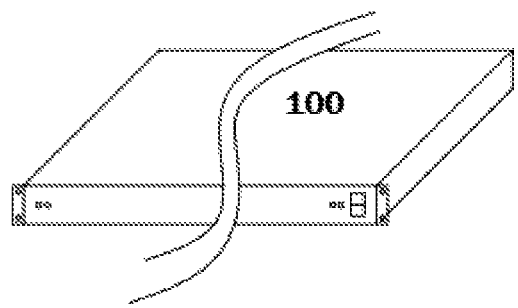
FIG. 2 shows the multiport power supply.
Figure 3:
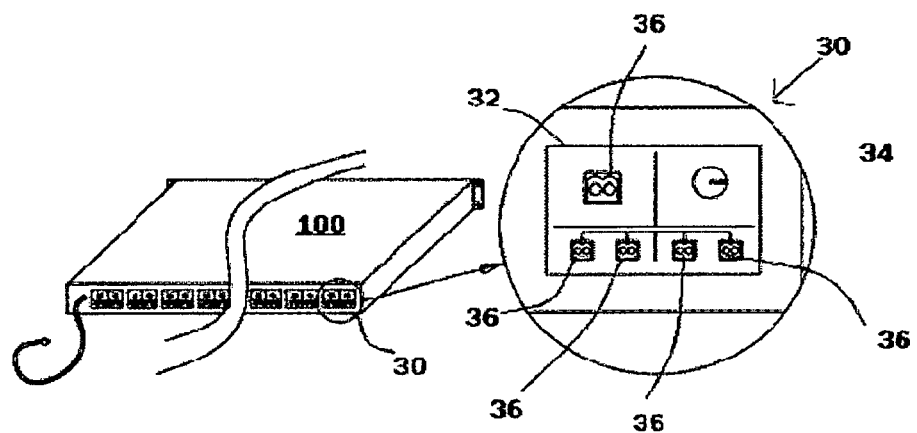
FIG. 3 shows the rear view of the multiport power supply.
Figure 4:
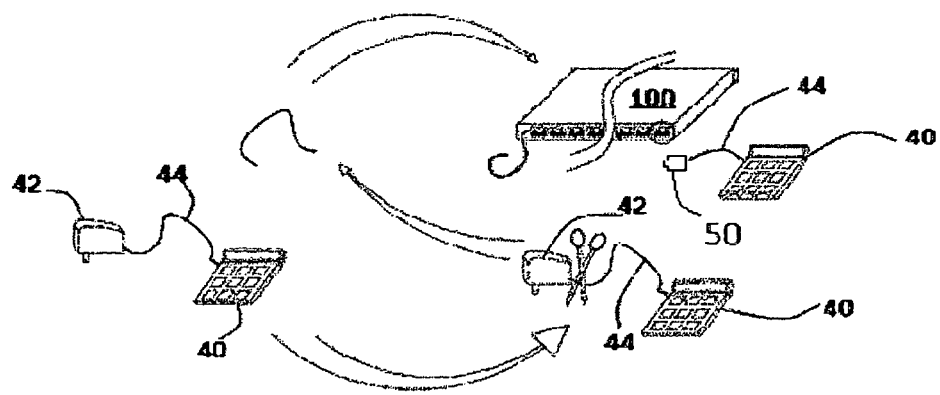
FIG. 4 shows the method of practicing the present invention.

As seen in FIGS. 1-4, the present invention is a method of supplying power to multiple electronic devices that are grouped within a specific space. The method comprising the steps of providing a multiport power supply 100, wherein the multiport power supply comprises of an AC/DC power supply 10, a distribution board 20 that has an integral fuse 22 that attaches to the AC/DC power supply 10, at least one power adjustment circuit 30 and wherein the power adjustment circuit 30 comprises a voltage regulator 32, a voltage selector 34, and at least one DC output port 36. Providing at least one electronic device 40 that has a power supply 42 and the power supply has a cord 44. Cutting the cord 44 of the power supply plug 42 of the electronic device 40. Attaching a terminal block connector 50 to the cord 44 of the electronic device 40. Connecting at least one of the terminal block connectors 50 to one of the DC output port 36 of the multiport power supply 100. And, reading a specification of each electronic device 40 and adjusting the voltage selector 34 so that the amperage and the voltage going to each electronic device 40 matches the specification of each electronic device 40.

The method can also comprise of attaching multiple electronic devices 40 that require the same voltage to operate to one of the terminal block connectors 36 and then calculating an amperage requirement to support the multiple devices 40 and adjusting the voltage selector 34 to match the voltage requirements of the multiple electronic devices 40.

A surge protector 60 may be integrated into the AC/DC power supply 10 of the present method.

An advantage of the present invention is that it provides a method of installing multiple DC electronic devices within a set space to a multiport power supply.

Another advantage of the present invention is that it eliminates the clutter created using power cords of multiple DC powered electronic devices.

A further advantage of the present invention it reduces failure points of electronic devices that are normally caused by forcibly plugging different sized plugs or adapters within existing power strips.

Yet a further advantage of the present invention is that is provides a manner of protecting DC powered equipment from surge or overpower via one multiport power supply.

While the inventor's above description contains many specificities, these should not be construed as limitations on the scope, but rather as an exemplification of several preferred embodiments thereof. Many other variations are possible. Accordingly, the scope should be determined not by the embodiments illustrated, but by the appended claims and their legal equivalents.

What is claimed is:

1. A method of supplying power to multiple electronic devices that are grouped within a specific space, comprising the steps of:
providing a multiport power supply, wherein the multiport power supply comprises of an AC/DC power supply, a distribution board that has an integral fuse that attaches to the AC/DC power supply, at least one power adjustment circuit and wherein the power adjustment circuit comprises a voltage regulator, a voltage selector, and at least one DC output port;
providing at least one electronic device that has a power supply plug and the power supply has a cord;
cutting the cord of the power supply of the electronic device;
attaching a terminal block connector to the cord of the electronic device;
connecting at least one of the terminal block connectors to one of the DC output ports; and
reading a specification of each electronic device and adjusting the voltage selector so that the amperage and the voltage going to each electronic device matches the specification of each electronic device.

2. The method of supplying power to multiple electronic devices that are grouped within a specific space of claim 1, comprising attaching multiple electronic devices that require the same voltage to operate to one of the terminal block connectors and then calculating an amperage requirement to support the multiple devices and adjusting the voltage selector to match the voltage requirements of the multiple electronic devices.

3. The method of supplying power to multiple electronic devices that are grouped within a specific space of claim 1, wherein a surge protector is integrated to the AC/DC power supply.

* * * * *